US012560110B2

(12) United States Patent
    Boot et al.

(10) Patent No.: US 12,560,110 B2
(45) Date of Patent: Feb. 24, 2026

(54) POPPET VALVE

(71) Applicant: Eaton Intelligent Power Limited,
                Dublin (IE)

(72) Inventors: Marco Aimo Boot, Turin (IT);
                Pierfrancesco De Giovanni, Lecce
                (IT); Luigi Lia, Turin (IT)

(73) Assignee: Eaton Intelligent Power Limited,
               Dublin (IE)

( * ) Notice: Subject to any disclaimer, the term of this
              patent is extended or adjusted under 35
              U.S.C. 154(b) by 147 days.

(21) Appl. No.: 18/472,060

(22) Filed: Sep. 21, 2023

(65) Prior Publication Data

US 2024/0011567 A1      Jan. 11, 2024

Related U.S. Application Data

(63) Continuation of application No.
     PCT/EP2022/025127, filed on Mar. 31, 2022.

(60) Provisional application No. 63/168,539, filed on Mar.
     31, 2021.

(51) Int. Cl.
     *F01L 3/20*      (2006.01)
     *F16K 1/38*      (2006.01)
     *F16K 49/00*     (2006.01)

(52) U.S. Cl.
     CPC ................ *F01L 3/20* (2013.01); *F16K 1/385*
                      (2013.01); *F16K 49/007* (2013.01)

(58) Field of Classification Search
     CPC ....... F01L 3/12; F01L 3/14; F01L 3/16; F01L
                3/18; F01L 3/20; F01L 3/08; Y10T
                                              29/49307
     See application file for complete search history.

(56) References Cited

U.S. PATENT DOCUMENTS

| | | | | |
|---|---|---|---|---|
| 1,683,077 A | * | 9/1928 | Joyce ........................ | F01L 3/12 |
| | | | | 29/888.45 |
| 2,089,749 A | * | 8/1937 | Jardine ..................... | F01L 3/14 |
| | | | | 29/888.45 |
| 2,119,042 A | * | 5/1938 | Charlton ................... | F01L 3/14 |
| | | | | 29/888.45 |
| 2,218,983 A | | 10/1940 | Daisley | |

(Continued)

FOREIGN PATENT DOCUMENTS

| | | |
|---|---|---|
| WO | WO 2017050468 A1 | 3/2017 |
| WO | WO 2019081397 A1 | 5/2019 |

OTHER PUBLICATIONS

International Search Report and Written Opinion for International
Application No. PCT/EP2022/025127, 10 pages.

*Primary Examiner* — Kevin F Murphy
(74) *Attorney, Agent, or Firm* — Baker Botts L.L.P.

(57) ABSTRACT

A poppet valve, in particular, a hollow poppet valve, can
include a valve stem; a valve cap; a valve body comprising
a longitudinal axis with a stem end to which the valve stem
is arranged and a cap end to which the valve cap is arranged,
the valve body further comprising a cavity with a stem
opening towards the stem end and a cap opening towards the
cap end; wherein the stem opening of the cavity is config-
ured to be closed by the valve stem and the cap opening of
the cavity is configured to be closed by the valve cap;
wherein the valve cap comprises a cap wall protruding into
the cavity along an interior circumference of the valve cap;
and wherein the cap wall comprises a cap wall formation.

15 Claims, 10 Drawing Sheets

FIG. 6

(56)  References Cited

U.S. PATENT DOCUMENTS

| | | | | |
|---|---|---|---|---|
| 2,636,255 A * | 4/1953 | Dit Jeudi | .................. | F01L 3/02 |
| | | | | 29/888.45 |
| 6,453,867 B1 * | 9/2002 | Ruhland | ................... | F01L 3/20 |
| | | | | 29/888.45 |
| 6,679,478 B2 * | 1/2004 | Murayama | ................ | F01L 3/20 |
| | | | | 251/368 |

* cited by examiner

POPPET VALVE

PRIORITY

This application is a continuation under 35 U.S.C. § 365(c) of International Patent Application No. PCT/EP2022/ 025127, filed 31 Mar. 2022, which claims the benefit of priority of U.S. Provisional Patent Application No. 63/168, 539, filed 31 Mar. 2021, which are incorporated herein by reference in their entirety.

TECHNICAL FIELD

This application relates to poppet valves. Poppet valves can be used in combustion engines to open and close the inlet and outlet ports to engine cylinders.

BACKGROUND

It is advantageous to provide poppet valves with enhanced heat exchange capabilities. It is also advantageous to have ease in assembly.

SUMMARY OF PARTICULAR EMBODIMENTS

The methods and devices disclosed herein overcome the above disadvantages and improves the art by way of poppet valves with improves ease in assembly. Aspects that facilitate the assembly can also improve the resilience of the poppet valve or can improve the stiffness of the poppet valve. Heat exchange formations can be included with low waste. The design poppet valve design facilitates interchangeability of stock parts for easy customization to customer specifications.

A poppet valve can comprise: a valve stem; a valve cap; a valve body comprising a longitudinal axis with a stem end to which the valve stem is arranged and a cap end to which the valve cap is arranged, the valve body further comprising a cavity with a stem opening towards the stem end and a cap opening towards the cap end; wherein the stem opening of the cavity is configured to be closed by the valve stem and the cap opening of the cavity is configured to be closed by the valve cap; wherein the valve cap comprises a cap wall protruding into the cavity along an interior circumference of the valve cap; and wherein the cap wall comprises a cap wall formation.

A poppet valve can include a cap wall formation operatively connected to a valve body. A poppet valve can include a valve body comprising a circumferential wall. The circumferential wall can be operatively connected to a valve cap. The circumferential wall can be operatively connected to a cap wall formation. A cap wall formation can comprise at least two projections. A circumferential wall formation can comprise at least two projections. A valve body cavity formation can comprise at least two projections.

A poppet valve can include a valve body comprising a circumferential wall formation. The circumferential wall formation can be operatively connected to a valve cap. The circumferential wall formation can be operatively connected to a cap wall formation.

A poppet valve can include a valve body comprising a valve body cavity formation protruding into a cavity. A valve cap can comprise a cap interior area and a cap interior formation.

A poppet valve can include a valve body comprising a perimeter edge and a valve cap comprising a perimeter portion, the perimeter edge bound by the 15 perimeter portion.

A poppet valve can comprise: a valve cap; a valve body comprising a longitudinal axis with a cap end to which the valve cap is arranged and a valve stem extending to a stem end, the valve body further comprising a cavity with a cap opening towards the cap end; wherein the cap opening of the cavity is configured to be closed by the valve cap; wherein the valve cap comprises a cap wall protruding into the cavity along an interior circumference of the valve cap; and wherein the cap wall comprises a cap wall formation.

A poppet valve can be manufactured by the steps of: forming a valve stem; forming a valve body having, along a longitudinal axis, a stem end and a cap end; forming the valve body to comprise a cavity with a stem opening towards the stem end and a cap opening towards the cap end; welding, affixing, or otherwise connecting the valve stem to the stem end of the valve body; forming a valve cap configured to close the cap opening of the valve body, the valve cap comprising a cap wall, a cap interior area, and a cap wall formation; and welding, affixing, or otherwise connecting the valve cap to the cap opening of the valve body.

A poppet valve can be manufactured by including the step of forming a valve cap such that a cap wall formation can operatively connect with a valve body.

A poppet valve can be manufactured by the steps of forming a cap wall and forming a cap wall formation separately from a valve cap, and wherein the cap wall and cap wall formation are welded, affixed, or otherwise connected to the valve cap.

Additional objects and advantages will be set forth in part in the description which follows, and in part will be obvious from the description, or can be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

DETAILED DESCRIPTION

Figure 1:
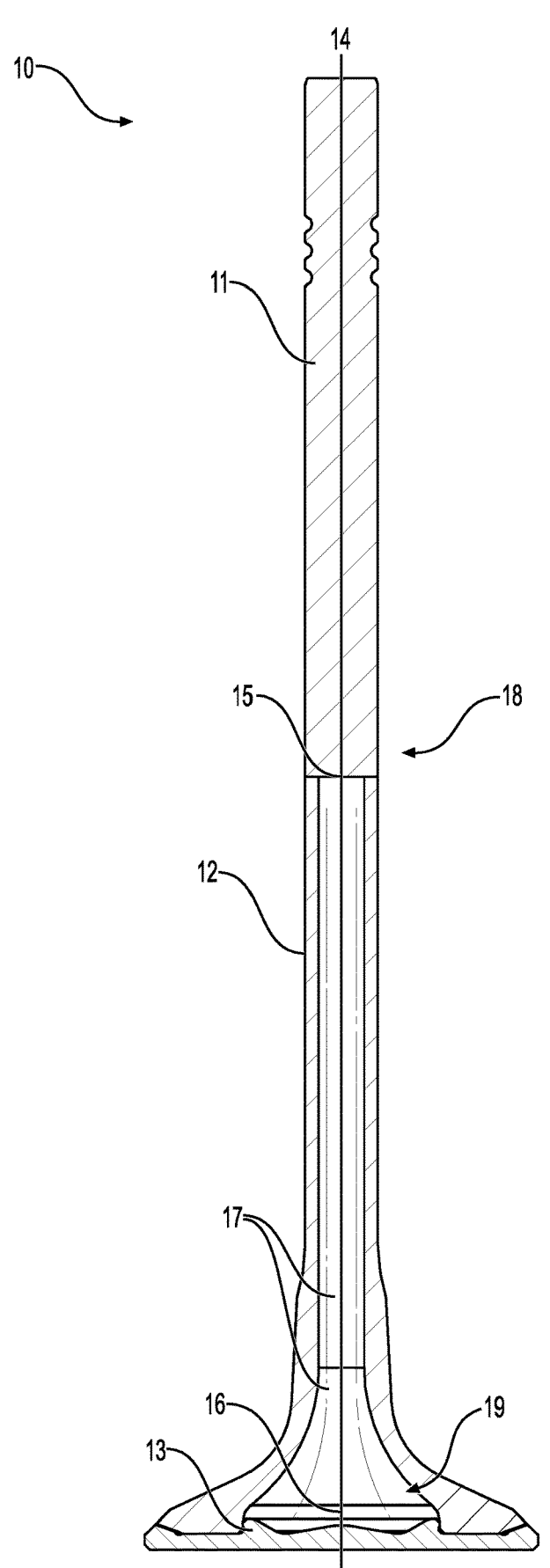
FIG. 1 is a cross-section view of a hollow poppet valve.

FIG. 1 is a cross-section illustrating the construction and cavities of a hollow poppet valve 10 with valve stem 11, valve body 12, and valve cap 13. Other variations known in the art can be used with the teachings herein, such as variations in joining multiple valve stem pieces, various inserts and internal formations, and alternatives to promote circulation and heat exchange.

Hollow poppet valve 10 comprises a valve stem 11. Valve stem 11 connects to valve body 12. Valve body 12 comprises a longitudinal axis 14 with a stem end 15 and a cap end 16, as well as a valve body cavity 17 along longitudinal axis 14. Body cavity 17 of valve body 12 has a stem opening 18 towards the stem end 15 and a cap opening 19 towards the cap end 16. Valve stem 11 can be welded or otherwise operatively connected to first end 15 of valve body 12 to seal stem opening 18 of body cavity 17. Valve cap 13 can be fastened to cap end 16 of valve body 12 to seal cap opening 19 of body cavity 17. Fastening can be achieved by welding, soldering, brazing, use of press-fit embossment(s), or other options to operatively connect the cap end 16 of valve body 12 to valve cap 13.

Valve stem 11, valve body 12, and valve cap 13 can each be manufactured from the same or different materials using the same or different manufacturing processes. Valve stem 11, valve body 12, and valve cap 13 can be manufactured using many different processes, including via stamping, forming, welding, molding, swaging, cold stamping, or machining including CNC machining, among others, and can comprise any metallic material. While FIG. 1 illustrates valve stem 11 and valve body 12 as separate, discrete components, valve stem 11 and valve body 12 can be manufactured as a single, integrated piece. Likewise, valve stem 11 can be manufactured as a single, integrated piece or valve stem 11 can be a collection of pieces joined together. For example, a rocker arm end of the valve stem 11 can be formed of one weight of material and the hollow portion of the valve stem 11 can be formed of one or more material of one or more different weight.

Figure 20:
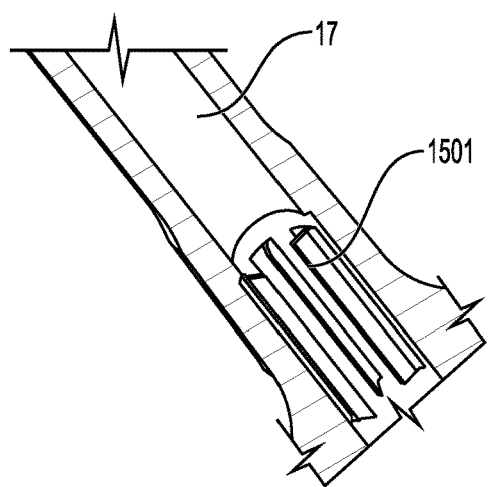
FIGS. 20-23 are cut-away and perspective views of alternative valve body cavity formations that can be co-formed with the valve body or inserted into the valve body.

While, as seen in this embodiment, body cavity 17 can be flared such that it becomes wider as it nears the second end 16 of the valve body 12, such flaring is not required and can be reduced or eliminated, for example, as shown in FIG. 20. Further, body cavity 17 can be partially filled or entirely filled with a thermally conductive material, such as sodium.

Other alternative ways of forming a valve stem known in the art are compatible with the teachings herein. For example, an alternative hollow poppet may comprise a valve stem 11, valve body 12, and valve cap 13, wherein valve stem 11 further comprises a valve stem cavity. The valve stem cavity comprises a valve stem cavity opening. Valve stem 11 is welded or otherwise connected to valve body 12 at stem end 15 of valve body 12 such that the valve stem cavity opening is sealed to, and fluidly connected to, stem opening 18 of valve body cavity 17. As with hollow poppet valve 10, cap opening 19 of valve body cavity 17 is closed with valve cap 13. Valve stem cavity 21 and valve body cavity 17 are filled partially or entirely with a thermally conductive material, such as sodium.

Note that while the valves discussed herein can comprise valve body cavity 17 and a valve stem cavity, both valve body cavity 17 and the valve stem cavity are optional and may be replaced by solid material.

Figure 2:
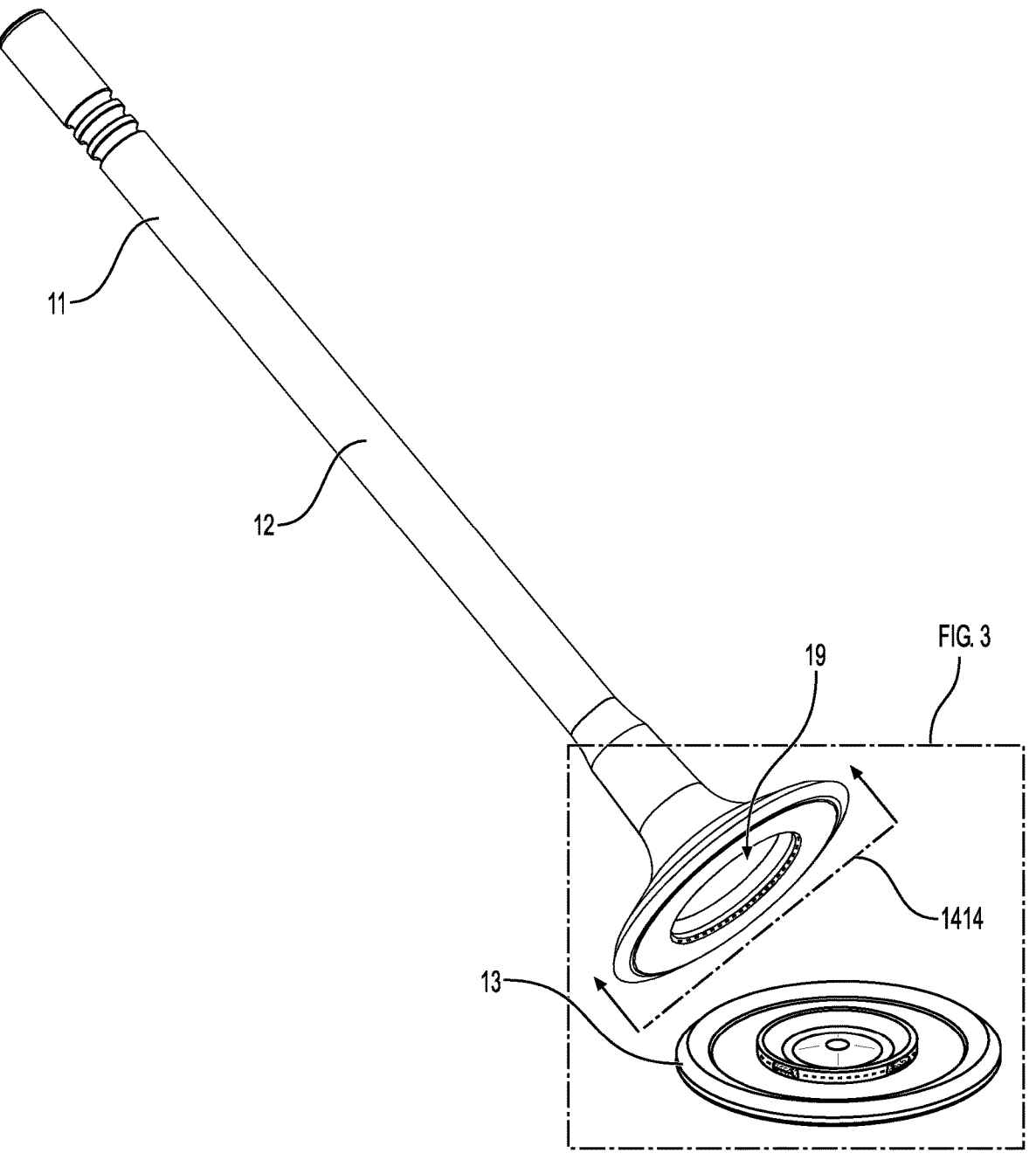
FIG. 2 is a perspective view of a hollow poppet valve with a detached valve cap.
Figures 3, 4:
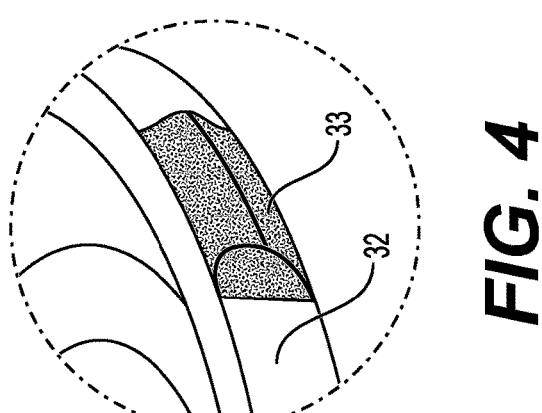
FIG. 3 is a detailed perspective view of a hollow poppet valve with a detached valve cap.
FIG. 4 is a detailed perspective view of a portion of a valve cap.

FIGS. 2-4 illustrate in greater detail the interface between valve body 12 and valve cap 13.

FIG. 2 shows valve stem 11 and valve body 12 with valve cap 13 removed, exposing cap opening 19 of the valve body cavity 14. As seen in greater detail in FIG. 3, valve body 12 comprises an interior circumferential wall 31 which can comprise a ring-like segment along the circumference of valve body cavity 17. While circumferential wall 31 can be at or near cap opening 19 of the valve body cavity 17, it can also be located further away from the second opening 19 or even towards stem opening 18 of the valve body cavity 17. Circumferential wall 31 can comprise a segment of valve body cavity 17 with a flat profile, angled, or curved profile. Circumferential wall 31 can comprise a segment of valve body cavity 17 which comes into contact with cap wall 32 and/or cap wall formation 33, which are discussed below. Valve body 12 also comprises interface segment 23, wherein valve body 12 is joined to valve cap 13, as well as perimeter edge 40.

As seen in FIG. 3, valve cap 13 comprises an inner side 37 and an outer side 38. Inner side 37 can comprise cap wall 32 and cap interior area 36. A perimeter portion 39 can extend from the inner side 37. Inner side 37 of the valve cap 13 can form an inner base against which interface segment 23 of the valve body 12 seats. The interface segment 23 of the valve body 12 can seat against a seating surface 41 of the valve cap 13. A perimeter edge 40 of the valve body 12 can be bounded by the perimeter portion 39 of the valve cap 13. Welding, brazing, soldering, joinery, or the like, can operatively couple the perimeter edge 40 and the perimeter portion 39. An outer side 38 of the valve cap 13 can face inlet and outlet ports to engine cylinders.

Cap wall 32 can be a raised surface formation of valve cap 13. When valve cap 13 is mated to valve body 12, cap wall 32 can fit within circumferential wall 31. Cap wall 32 can be circular or comprise a circular portion. Cap wall 32 can be transverse to the inner side 38 or it can project at another angle. A welded interface can be formed by welding perimeter portion 39 to perimeter edge 40. Cap wall 32 can comprise cap wall formation 33. Cap wall formation 33 can comprise, as shown in FIG. 3 and FIG. 4, a projection or projections from cap wall 32. Cap wall formation 33 can be manufactured integrally with valve cap 13, or manufactured separately then combined with valve cap 13 via welding or other joining techniques. Cap interior area 36 comprises the area proximate to the center of valve cap 13 and may further comprise cap interior formation 52, to be discussed in greater detail below.

Cap wall formation 33 can interface with circumferential wall 31. A press-fit can join cap wall formation 33 to circumferential wall 31. The press-fit can cause a snug connection between cap wall formation 33 and circumferential wall 31, or, a small amount of play can be permitted without the valve cap 13 falling off of the valve body 12. Cap wall formation 33 can reinforce the mating of valve body 12 and valve cap 13 during the manufacturing process, before valve body 12 and valve cap 13 are welded or otherwise joined. Cap wall formation 33 can also seal entirely, or partially, valve body cavity 17 from any welding or joining process between valve body 12 and valve cap 13. Because valve body cavity 17 can be filled, or partially filled, with one or more thermally conductive material such as sodium or another fluid with or without agitators, full or partial sealing by cap wall formation 33 can separate, at least partially, the thermally conductive material in valve body cavity 17 from the welding or other joining process of valve body 12 and valve cap 13.

Further, during operation, cap wall formation 33 can isolate or at least protect partially the welding or other joining mechanisms between valve body 12 and valve cap 13 from the thermally conductive material in valve body cavity 17. In addition to securing the valve cap 13 to the valve body 12 during manufacture, cap wall formation 33 can provide additional rigidity to poppet valve 10 during operation.

As seen in FIG. 4, cap wall formation 33 can comprise a profile with a wide circumference transitioning into a downward slant to promote reception and retention of circumferential wall 31. Cap wall formation 33 can adopt other complementary shapes and configurations as well. For example, while an ogee is illustrated in FIG. 4, a round over or bullnose shape can be used. A rounded shape is illustrated, but more angular wedge-shapes or crush-coupling shapes can be used.

Figure 5:
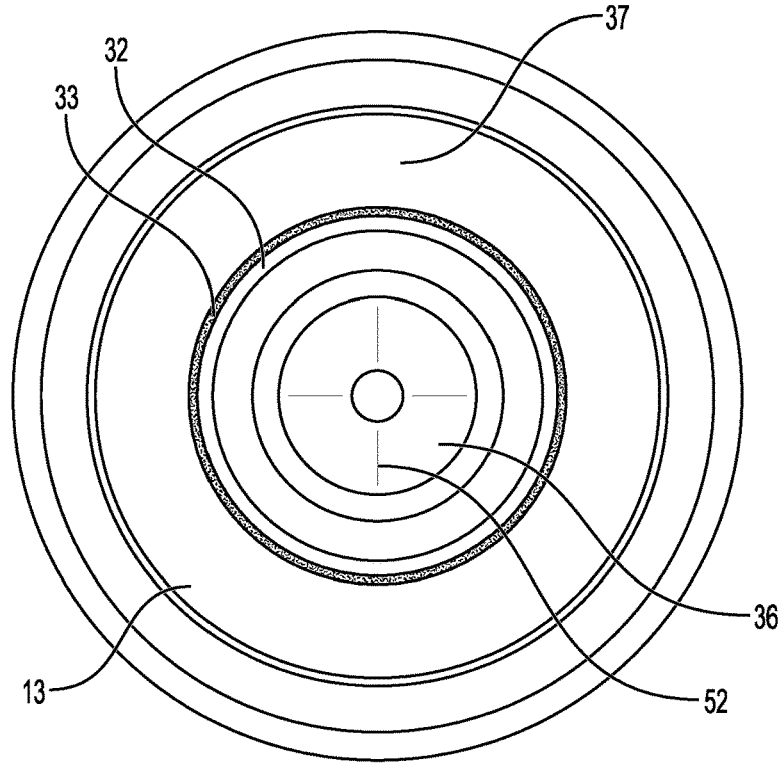
FIG. 5 is an overhead view of a valve cap.
Figure 6:
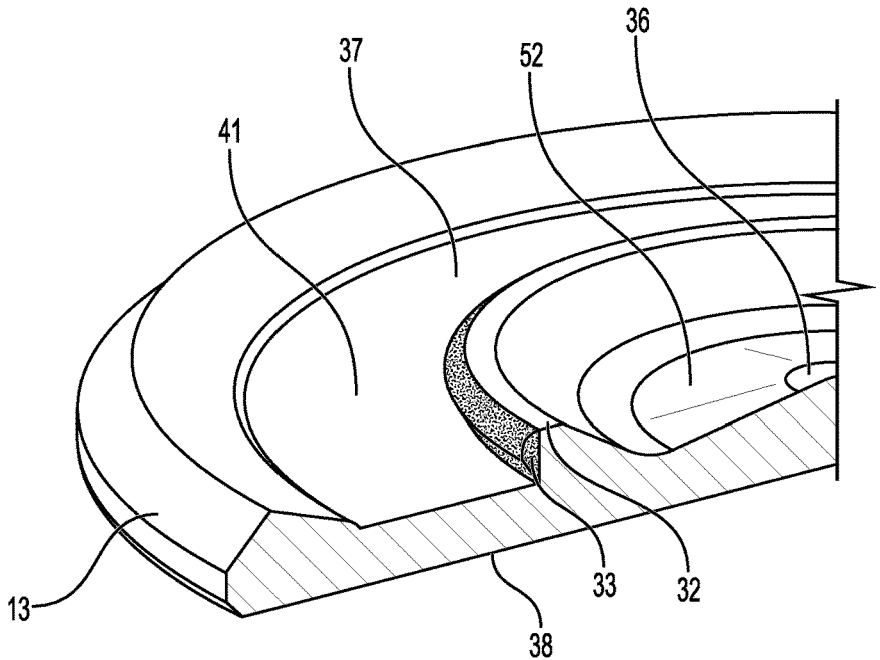
FIG. 6 is a cut-away perspective view of a valve cap.

While FIGS. 3 and 4 illustrate cap wall formation 33 as several distinct extensions from cap wall 32, as seen in FIGS. 5 and 6, cap wall formation 33 can also comprise a single, continuous projection from cap wall 32, along the entirely of the circumference of cap wall 32. While FIG. 6 shows cap wall formation 33 with a similar profile to FIG. 4, namely a wide circumference transitioning into a taper away from valve body 12, cap wall formation 33 can take the form of other shapes and configurations as well. As will be discussed later, FIG. 5-6 also illustrates a valve cap 13 with a cap interior area 36 comprising cap interior formation 52.

Figures 7, 8, 9:
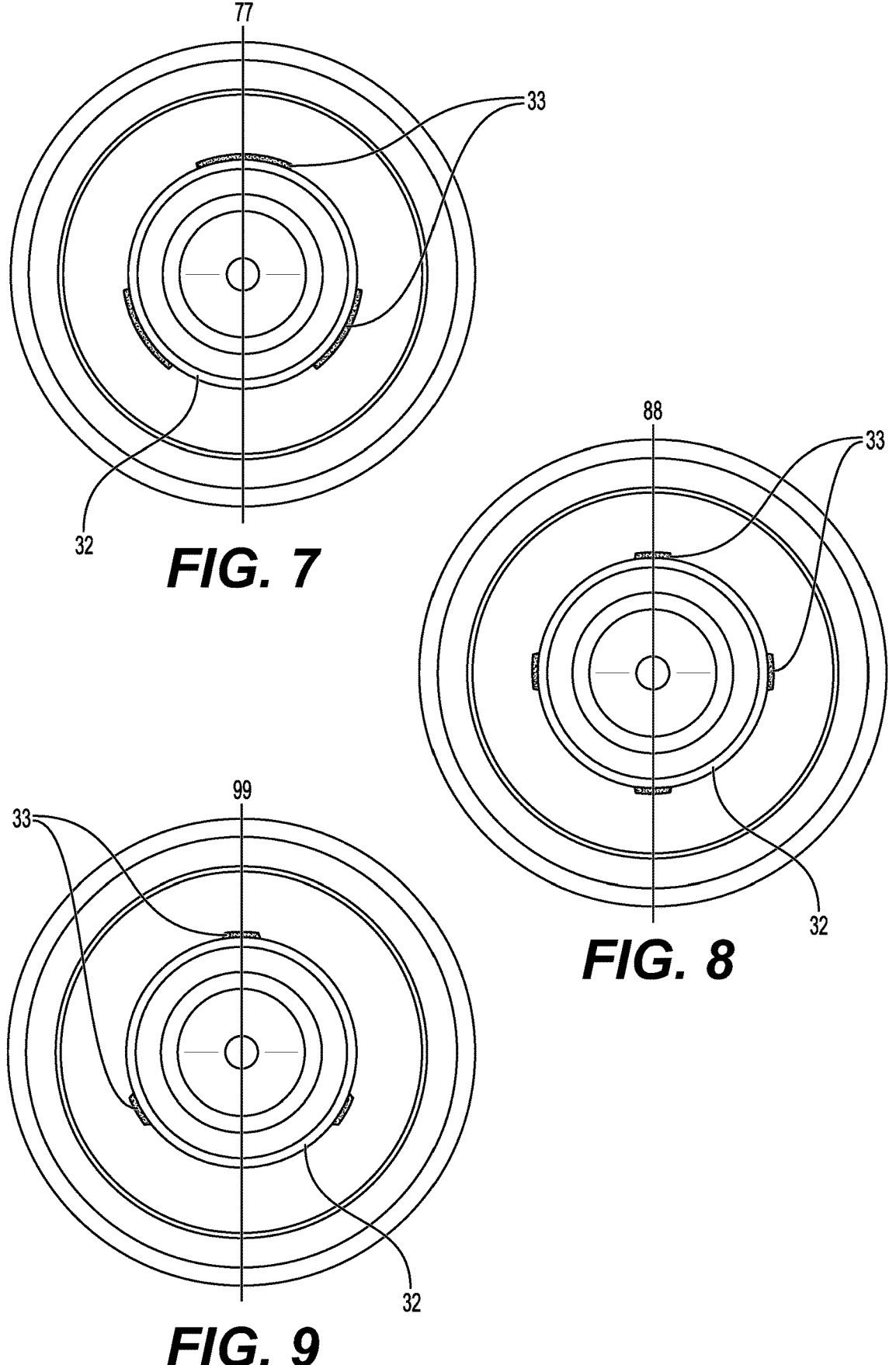
FIGS. 7-9 are overhead views of alternative valve caps.

As shown in FIG. 7-9, cap wall formation 33 can adopt many different configurations. For example, the cap wall formation 33 shown in FIG. 7 comprises three projections from cap wall 32 which are symmetric about axis 77. FIG. 8 illustrates cap wall formation 33 comprising four projections from cap wall 32 symmetric with respect to axis 88. FIG. 9 shows cap wall formation 33 comprising three projections from cap wall 32 of less length compared to those seen in FIG. 7 and symmetric about axis 99. Cap wall formations 33 can be set in a groove in the cap wall 32 as by riveting or press-fitting or the like. Or, cap wall formations 33 can be integrally molded or crimped in the cap wall 32, among other options.

As shown in FIG. 7-9, cap wall formation 33 can adopt numerous configurations. Though FIG. 7-9 show cap wall formation 33 comprising generally symmetric extensions from cap wall 32, cap wall formation 33 are not required to be symmetric about an axis and can be distributed at random around the circumference of cap wall 32. Cap wall formation 33 can comprise repeating patterns or an isolated design. The distribution and shape selections can be made for light grip during manufacture or a harder grip to assist with poppet valve performance during combustion operation. Moreover, while FIG. 7-9 show cap wall formation 33 comprising individual extensions of generally similar dimensions, the individual extensions can vary from each other—similarity is not required. The shapes can be dissimilar about the circumference of the cap wall 32, resulting in 5 dissimilar grip strength around the interface. The random distribution around the circumference of the cap wall 32 can be implemented because the grip of the cap wall formations 33 with the circumferential wall 31 can be augmented by the weld or other connection between the perimeter portion 39 and the perimeter edge 40. So, cap wall formation 33 can be inserted, slid, or snapped into a track-like groove in cap wall 32. A clearance to slide the inserts into place can be used.

Figure 10:
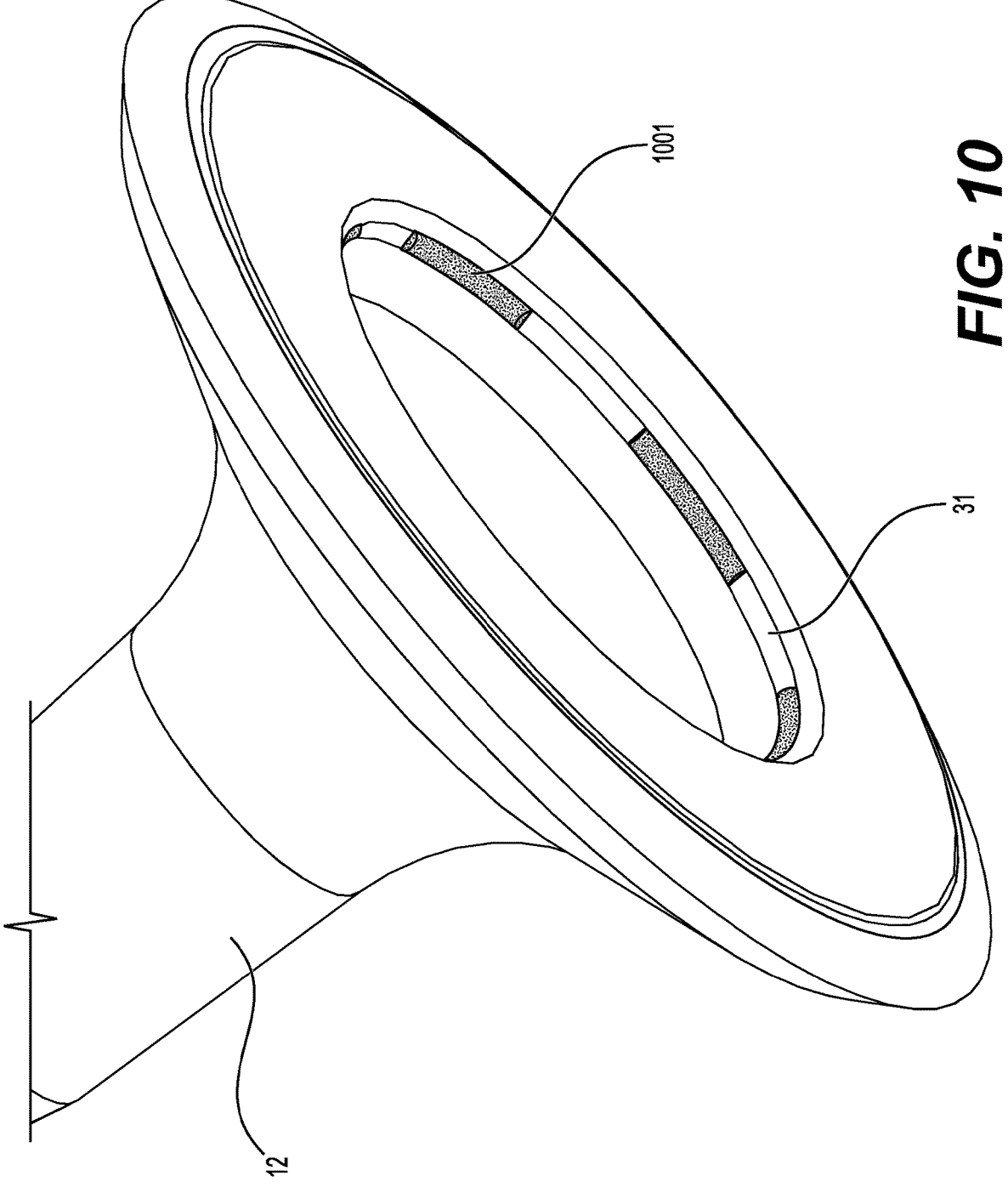
FIG. 10 is a perspective view of a valve body.

FIG. 10 shows valve body 12 comprising circumferential wall 31 with circumferential wall formation 1001. While circumferential wall 31 can be proximate to cap opening 19 of the valve body cavity 17, circumferential wall 31 can be located further away from the cap opening 19 or even towards stem opening 18 of the valve body cavity 17. Circumferential wall formation 1001 comprises projections from circumferential wall 31. Circumferential wall formation 1001 can be manufactured integrally with valve body 12, or manufactured separately then combined with valve body 12. For example, circumferential wall formation 1001 can be set in a groove in circumferential wall 31 as by riveting or press-fitting or the like. Or, circumferential wall formation 1001 can be integrally molded or crimped in circumferential wall 31, among other options. Circumferential wall 31 and/or circumferential wall formation 1001 can mate with cap wall 32 and/or cap wall formation 33.

Circumferential wall formation 1001 can reinforce the mating of valve body 12 and valve cap 13 during the manufacturing process, before valve body 12 and valve cap 13 are welded or otherwise joined. Circumferential wall formation 1001 can also seal entirely, or partially, valve body cavity 17 from any welding or joining process. Because valve body cavity 17 can be filled, or partially filled, with sodium or other thermally conductive material, full or partial sealing by circumferential wall formation 1001 can separate the thermally conductive material in valve body cavity 17 from the welding or other joining processes of valve body 12 and valve cap 13.

As retention mechanisms, cap wall formation 33 and circumferential wall formation 1001 can adopt numerous configurations, including those already outlined above. Though FIG. 10 shows circumferential wall formation 1001 as comprising several distinct projections from circumferential wall 31, circumferential wall formation 1001 can alternatively comprise a single projection about the entire circumference of circumferential wall 31. Circumferential wall formation 1001 can comprise several projections about circumferential wall 31. Similarly, as explained above, these projections can be symmetric about an axis, or can be asymmetric. The size of the projections can also be similar or dissimilar. Circumferential wall formation 1001 can comprise repeating patterns or an isolated design. The profile of circumferential wall formation 1001 can comprise a wide circumference transitioning into a slant towards stem opening 15 of valve body cavity 17. Circumferential wall formation 1001 can adopt other profiles as well. Further, the profile of the projections can be similar or dissimilar.

Circumferential wall formation 1001 can be configured to complement cap wall formation 33. For example, when valve body 12 and valve cap 13 are mated, projections of circumferential wall formation 1001 can be positioned where projections of cap wall formation 33 are absent, and vice versa. Circumferential wall formation 1001 can also be configured to overlap with cap wall formation 33 such that circumferential wall formation 1001 can interlock with cap wall formation 33.

Figures 11, 12, 13:
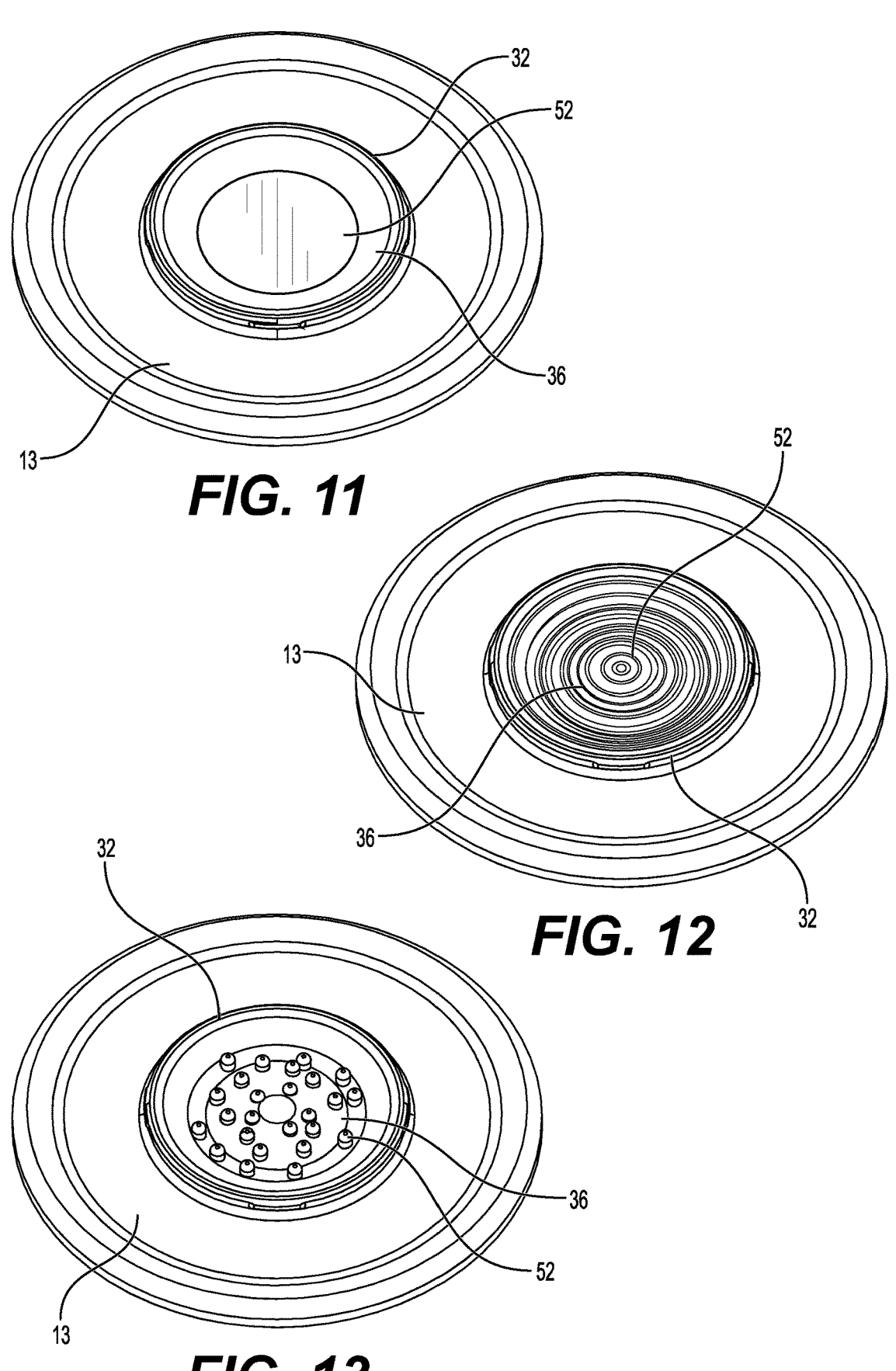
FIGS. 11-13 are perspective views of alternative interior formations of valve caps.

As seen in FIGS. 5, 6, and 11-13, valve cap 13 can also include formations to further promote heat transfer. FIG. 11 illustrates a valve cap 13 with a cap wall 32 and cap interior area 36 comprising a flat cap interior formation 52. FIGS. 5 and 6 illustrate a valve cap 13 with cap interior area 36 comprising a cap interior formation 52 that is convex. In FIGS. 5 and 6, cap interior formation 52 can comprise several alternative gradients and can be characterized as conical and raised. It can provide additional surface area for coolant material to interface and transfer heat, and it can alternatively provide extra material promoting rigidity. FIG. 12 illustrates a valve cap 13 with cap interior formation 52 comprising concentric circles as yet another approach to increasing the surface area for thermal transfer and for structural reinforcement. FIG. 13 shows a valve cap 13 with cap interior formation 52 comprising asymmetric projections which also increase the thermal transfer area. Numerous alternatives exist in the art to promote heat transfer fluid agitation, such as fins, dimples, stipples, among others.

Thus, cap interior area 36 of valve cap 13 can be configured with a cap interior formation 52 comprising any number of patterns of material, or distributions of material, suitable for purposes such as increasing the surface area, heat transfer capacity, or physical resilience of valve cap 13. These patterns can be symmetric or asymmetric, can comprise material projections of similar size or dissimilar size, and can comprise material projections of similar shape or dissimilar shapes. Cap interior formation 52 can comprise repeating patterns or an isolated design. Further, cap interior formation 52 can be manufactured integrally with valve cap 13, or manufactured separately then combined with valve cap 13.

Figure 14:
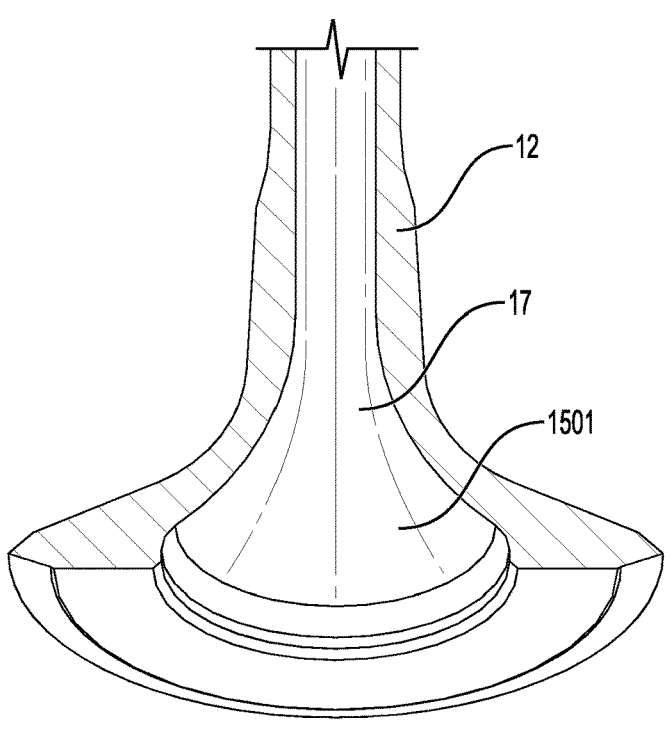
FIGS. 14-17 are cut-away views of alternative valve bodies approximately taken along line 1414 of FIG. 2.
Figure 15:
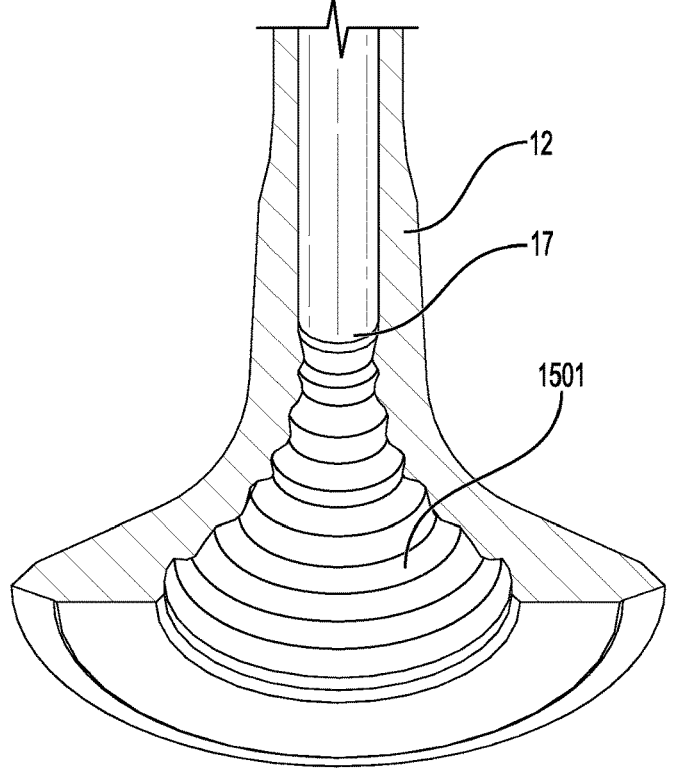
Figure 16:
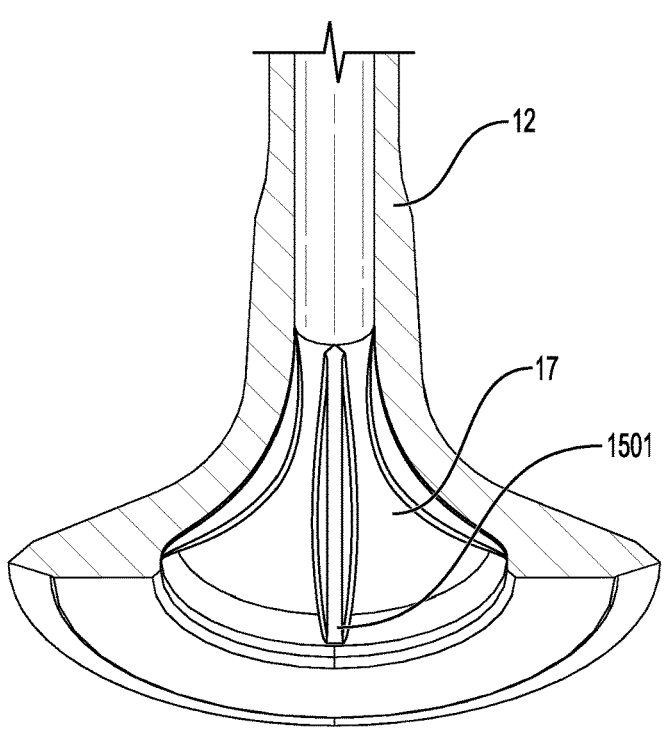
Figure 17:
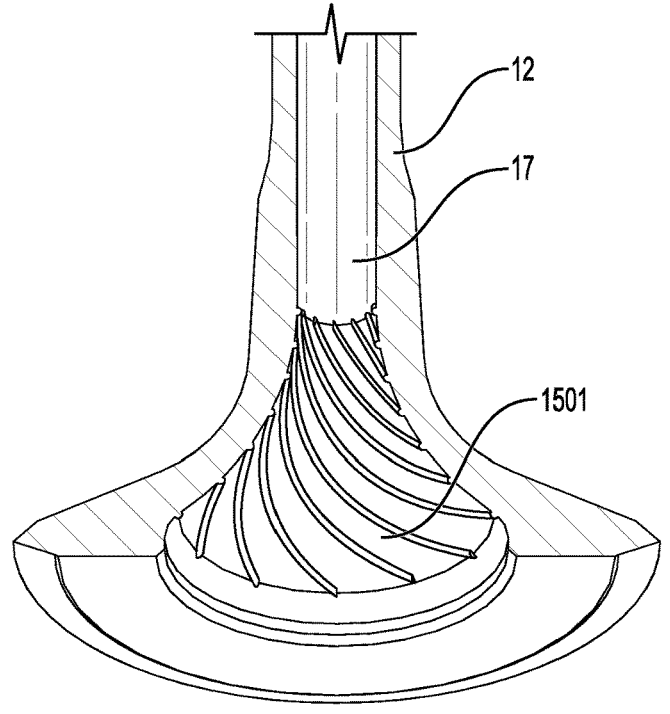

FIGS. 14-17 show perspective views of valve body 12 with a cutaway indicated at approximately line 1414 on FIG. 2. As shown in FIGS. 14-17, valve body cavity 17 can also be configured to promote thermal transfer as well as reinforce structural resilience. In FIG. 14, valve body cavity 17 with valve body cavity formation 1501 comprises a smooth wall which can facilitate the flow of thermal transfer material though the valve body cavity 17. In this option, the thermal fluid can swirl and flow unimpeded by a texture in cap interior 36. The cap wall 32 can be shaped to facilitate the swirl. FIG. 15 illustrates a valve body cavity 17 with valve body cavity formation 1501 comprising concentric rings arranged about the circumference of valve body cavity 17, thereby increasing the surface area for thermal transfer and the rigidity of valve body 12. FIG. 16 shows valve body cavity 17 with valve body cavity formation 1501 comprising radial fins to increase the surface area available for transferring thermal energy and physically reinforcing valve body 12. FIG. 17 shows valve body cavity 17 with valve body cavity formation 1501 comprising helical lines which also increase the surface area for thermal transfer and bolster the rigidity of valve body 12. These examples are nonlimiting, and other alternative shapes and patterns can be substituted with the teachings herein.

Figure 18:
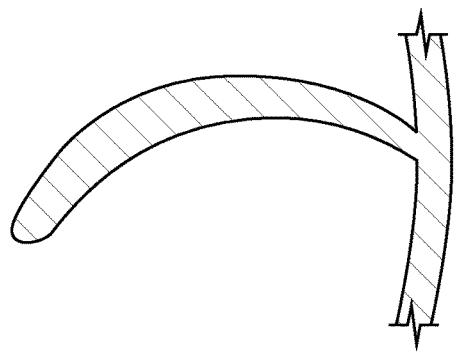
FIGS. 18 and 19 are alternative wave templates for use in a valve body cavity formation, which templates can also be used to form inserts.
Figure 19:
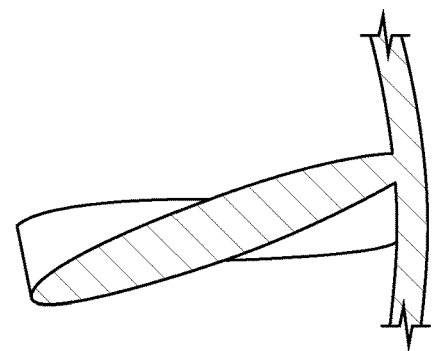

FIG. 18 illustrates a wave template which can be repeated along the walls of valve body cavity 17 to comprise valve body cavity formation 1501. This wave configuration for valve body cavity formation 1501 is another approach for increasing the possible thermal transfer area and providing structural integrity. FIG. 19 illustrates a twist-tie template for valve body cavity formation 1501 which can be repeated along the walls of valve body cavity 17 to comprise valve body cavity formation 1501 and is yet another alternative approach for increasing possible thermal transfer area and bolstering the rigidity of valve body 12. FIGS. 18 and 19 can be the basis for a repeated pattern for an insert that is housed in valve body cavity 17.

Figure 21:
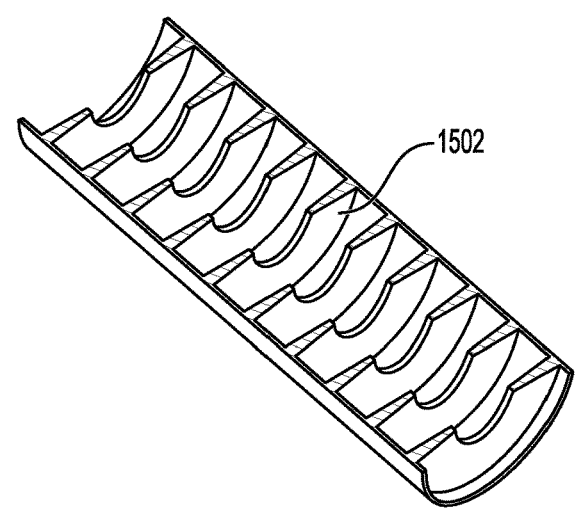
Figure 22:
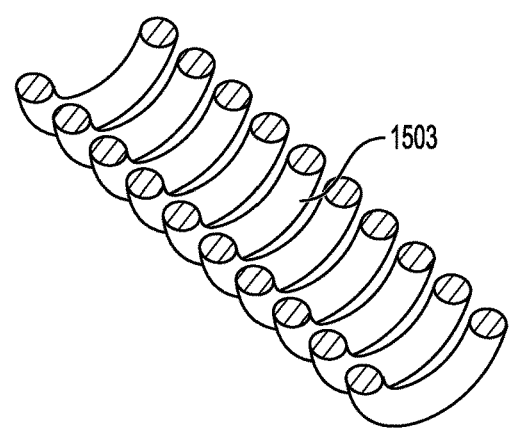
Figure 23:
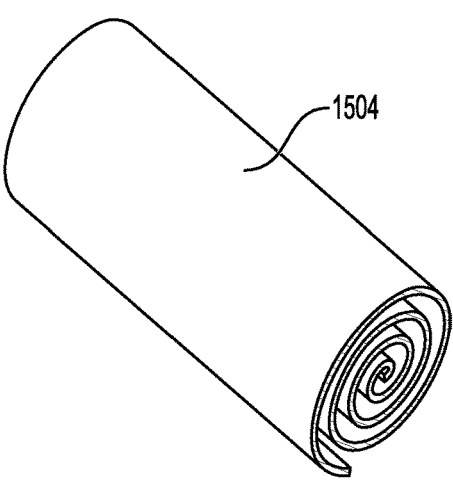

FIG. 20 shows a portion of valve body cavity 17 and valve body cavity formation 1501 comprising circumferential fins to increase the surface area for thermal transfer and reinforce valve body 12. Rolled sheets of material can be concentrically stacked and slid into valve body cavity 17. FIG. 21 illustrates an optional valve body cavity formation 1502 configuration comprising a series of rings for benefits such as thermal management and structural reinforcement. FIG. 22 shows another optional valve body cavity formation 1503 configuration comprising stacked rings, which could be helical, to promote benefits such as heat transfer and structural rigidity. FIG. 23 illustrates yet another potential valve body cavity formation 1504 configuration comprising rolled or spiraled, thermally conductive material.

While several configurations for valve body cavity formation 1501 are shown, many other configurations for promoting thermal transfer are possible. Valve body cavity formation 1501 can comprise configurations that are symmetric or asymmetric, and configurations which include projections which are of similar, 20 dissimilar, or altogether randomized shapes and sizes, for example, pellets, shavings, granules, etc. Valve body cavity formation 1501 may comprise repeating patterns or an isolated design. Further, valve body cavity formation 1501 can be manufactured integrally with valve body 12, or manufactured separately then combined with valve body 12.

In view of the foregoing, it can be said that a poppet valve can comprise: a valve stem; a valve cap; a valve body comprising a longitudinal axis with a stem end to which the valve stem is arranged and a cap end to which the valve cap is arranged, the valve body further comprising a cavity with a stem opening towards the stem end and a cap opening towards the cap end; wherein the stem opening of the cavity is configured to be closed by the valve stem and the cap opening of the cavity is configured to be closed by the valve cap; wherein the valve cap comprises a cap wall protruding into the cavity along an interior circumference of the valve cap; and wherein the cap wall comprises a cap wall formation.

Alternatives usable together and separately can be as follows. A poppet valve can include a cap wall formation operatively connected to a valve body. A valve body can comprise a circumferential wall. A circumferential wall can be operatively connected to a valve cap. A circumferential wall can be operatively connected to a cap wall formation.

A valve body can comprise a circumferential wall formation. A circumferential wall formation can be operatively connected to a valve cap. A circumferential wall formation can be operatively connected to a cap wall formation.

A valve body can comprise a valve body cavity formation protruding into a cavity. A valve cap can comprise a cap interior area and a cap interior formation. A cap wall formation can comprise at least two projections. A circumferential wall formation can comprise at least two projections. A valve body cavity formation can comprise at least two projections.

A poppet valve can include a valve body comprising a perimeter edge and a valve cap comprising a perimeter portion, the perimeter edge bound by the perimeter portion.

A poppet valve can comprise: a valve cap; a valve body comprising a longitudinal axis with a cap end to which the valve cap is arranged and a valve stem extending to a stem end, the valve body further comprising a cavity with a cap opening towards the cap end; wherein the cap opening of the cavity is configured to be closed by the valve cap; wherein the valve cap comprises a cap wall protruding into the cavity along an interior circumference of the valve cap; and wherein the cap wall comprises a cap wall formation.

A poppet valve can be manufactured by the steps of: forming a valve stem; forming a valve body having, along a longitudinal axis, a stem end and a cap end; forming the valve body to comprise a cavity with a stem opening towards the stem end and a cap opening towards the cap end; welding, affixing, or otherwise connecting the valve stem to the stem end of the valve body; forming a valve cap configured to close the cap opening of the valve body, the valve cap comprising a cap wall, a cap interior area, and a cap wall formation; and welding, affixing, or otherwise connecting the valve cap to the cap opening of the valve body.

A poppet valve can be manufactured by including the step of forming a valve cap such that a cap wall formation can operatively connect with a valve body.

A poppet valve can be manufactured by the steps of forming a cap wall and forming a cap wall formation separately from a valve cap, and wherein the cap wall and cap wall formation are welded, affixed, or otherwise connected to the valve cap.

Other implementations will be apparent to those skilled in the art from consideration of the specification and practice of the examples disclosed herein.

What is claimed is:

1. A poppet valve, comprising:
a valve stem;
a valve cap comprising an inner side; and
a valve body comprising a longitudinal axis with a stem end to which the valve stem is arranged and a cap end to which the valve cap is arranged, the valve body further comprising (a) a cavity with a stem opening towards the stem end and a cap opening towards the cap end and (b) a circumferential wall around the cap opening,
    wherein the stem opening of the cavity is configured to be closed by the valve stem and the cap opening of the cavity is configured to be closed by the valve cap,
    wherein the valve cap comprises a cap wall projecting from the inner side of the valve cap and into the cavity when the cavity is closed by the valve cap, and
wherein the cap wall comprises a cap wall formation protruding from a surface of the cap wall, the cap wall formation is configured to press against the circumferential wall of the valve body when the cavity is closed by the valve cap.

2. The poppet valve of claim 1, wherein the cap wall formation covers at least one dimension of the surface of the cap wall.

3. The poppet valve of claim 1, wherein the cap wall formation is configured to partially or entirely to seal the circumferential wall of the valve body when the cavity is closed by the valve cap.

4. The poppet valve of claim 1, wherein the circumferential wall of the valve body operatively connects to the valve cap.

5. The poppet valve of claim 1, wherein the circumferential wall is an interior circumferential wall, and wherein the surface of the cap wall from which the cap wall formation protrudes is an exterior surface of the cap wall.

6. The poppet valve of claim 1, wherein the valve body further comprises a circumferential wall formation.

7. The poppet valve of claim 6, wherein the circumferential wall formation operatively connects to the valve cap.

8. The poppet valve of claim 6, wherein the circumferential wall formation operatively connects to the cap wall formation.

9. The poppet valve of claim 6, wherein the circumferential wall formation comprises at least two projections.

10. The poppet valve of claim 1, wherein the valve body further comprises a valve body cavity formation protruding into the cavity.

11. The poppet valve of claim 10, wherein the valve body cavity formation comprises at least two projections.

12. The poppet valve of claim 1, wherein the valve cap further comprises a cap interior area and a cap interior formation.

13. The poppet valve of claim 1, wherein the cap wall formation comprises at least two projections.

14. The poppet valve of claim 1, wherein the valve body further comprises a perimeter edge and the valve cap further comprises a perimeter portion, the perimeter edge bound by the perimeter portion.

15. A poppet valve, comprising:
a valve cap comprising an inner side; and
a valve body comprising a longitudinal axis with a cap end to which the valve cap is arranged and a valve stem extending to a stem end, the valve body further comprising (a) a cavity with a cap opening towards the cap end and (b) a circumferential wall around the cap opening,
wherein the cap opening of the cavity is configured to be closed by the valve cap,
wherein the valve cap comprises a cap wall projecting from the inner side of the valve cap and into the cavity when the cavity is closed by the valve cap, and
wherein the cap wall comprises a cap wall formation protruding from a surface of the cap wall, the cap wall formation is configured to press against the circumferential wall of the valve body when the cavity is closed by the valve cap.

* * * * *